United States Patent [19]

Kanazashi et al.

[11] 4,109,281
[45] Aug. 22, 1978

[54] TERMINAL DEVICE FOR CATV

[75] Inventors: Tetsuo Kanazashi; Tsuyoshi Fujiwara, both of Tokyo, Japan

[73] Assignee: Pioneer Electronic Corporation, Tokyo, Japan

[21] Appl. No.: 787,592

[22] Filed: Apr. 14, 1977

[30] Foreign Application Priority Data

May 7, 1976 [JP] Japan .................................. 51-51964

[51] Int. Cl.² ............................................. H04N 1/44
[52] U.S. Cl. .................................... 358/114; 325/308; 358/86
[58] Field of Search .......................... 358/86, 114–124, 358/259, 21, 31, 39, 40; 325/308

[56] References Cited

U.S. PATENT DOCUMENTS

| 3,777,053 | 12/1973 | Wittig et al. | 358/117 |
| 3,826,863 | 7/1974 | Johnson | 358/122 |
| 3,882,266 | 5/1975 | Walding | 358/86 |

Primary Examiner—S. C. Buczinski
Attorney, Agent, or Firm—Fraser and Bogucki

[57] ABSTRACT

In a CATV system, a received signal band containing video channels and a data signal at a selected frequency is successively converted in frequency so as to provide a chosen video signal at the frequency of a selected channel. After the first conversion a residual fundamental of the data signal carrier is bandpass filtered, amplified and then demodulated to extract the data signal. The needed filtering and signal processing can thereby be more economically accomplished without adverse effects on adjacent video signal channels.

4 Claims, 1 Drawing Figure

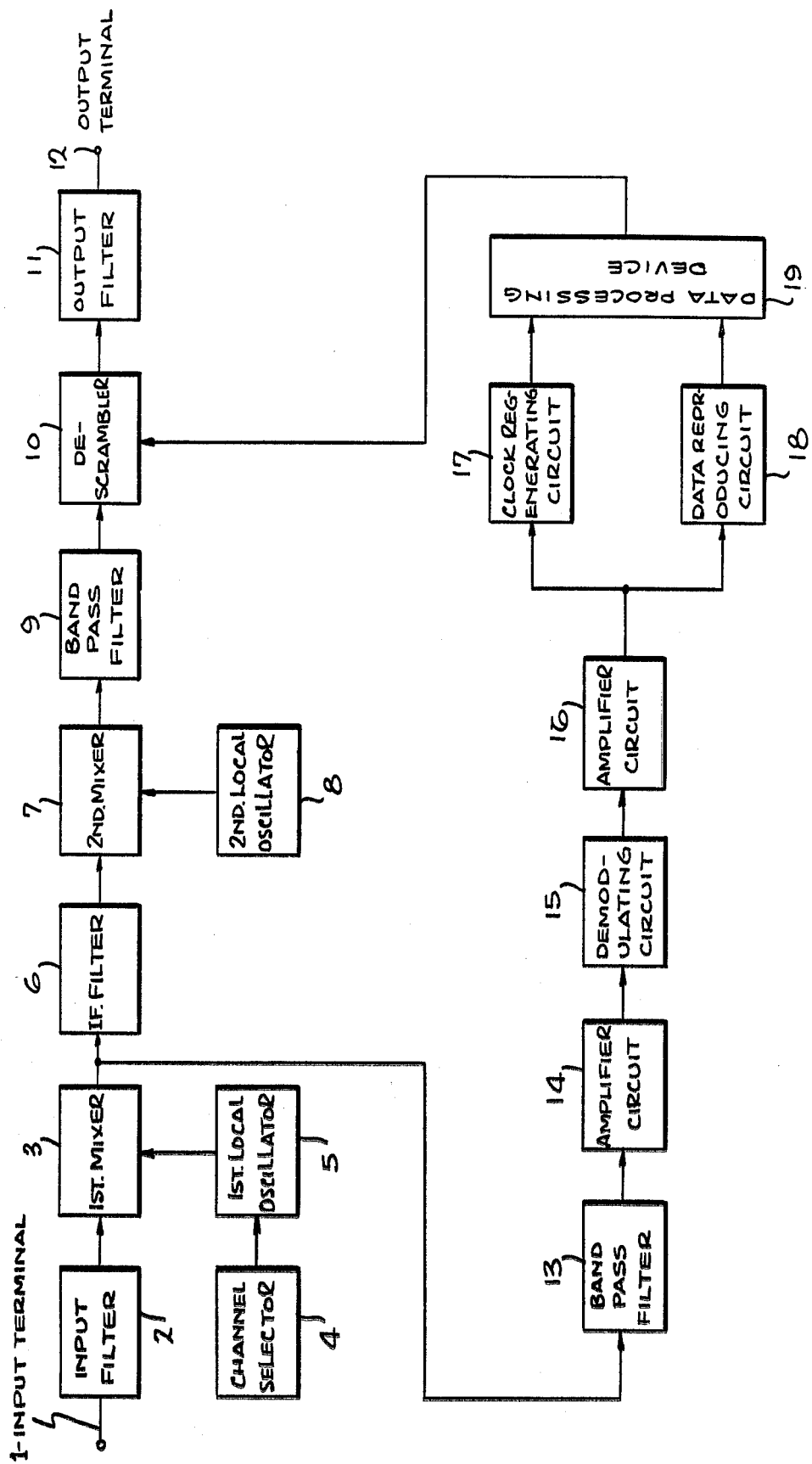

TERMINAL DEVICE FOR CATV

BACKGROUND OF THE INVENTION

This invention relates to a terminal device for CATV which receives multichannel TV signals and a downstream data signal both sent from a head end, converts the frequency of any one of the TV signals into a value adapted to be received in an ordinary TV receiver, and if it is required, executes the instruction included in the downstream data signal.

Various types of pay television and CATV systems are known. In one type of system, unmodified TV signals are sent unidirectionally from a central station (or head end) to a terminal device. In another type of system, not only TV signals but also a control signal (downstream data signal) are transmitted to control the operation of the terminal device and furthermore actuate indicators and other devices. In still another type of CATV system, in addition to the above described TV signals and control signal sent from the head end to the terminal device, another signal (upstream data signal) is transmitted for reporting the operational condition of the terminal device to the head end, thus constituting a bidirectional transmission system.

In the types of the systems wherein not only TV signals but also downstream data signals are transmitted, the terminal device should have functions for converting the frequency of any one of the TV signals to a value receivable by a conventional TV receiver, and also for receiving and analyzing the downstream data signal and performing a predetermined operation. To this end, it is required that the received signal over a cable be separated into TV signals and the downstream data signal, and that a buffer circuit be provided for eliminating deleterious effects between the separating circuits of the TV signals and the downstream data signal, and for preventing interference between the separating circuit and other circuits connected prior or subsequent to the separating circuit. For example, the CATV signal bandwidth used by the head end system may encompass 50–300 mHz with the data signal having a carrier frequency of about 115–120 mHz and the adjacent video channel being separated only by a few megahertz. Under these conditions, extremely sharp notch and bandpass filter techniques must be used, and even so the adjacent video channel can be adversely affected by the nonuniform characteristic of the edge of the passband of the filter.

A primary object of the present invention is to provide a terminal device for CATV, wherein any adverse effect on the TV signal from the downstream data receiving portion is prevented.

Another object of the invention is to provide a terminal device for CATV, wherein no specific provision of buffer circuit is required for preventing deleterious effects caused by the receiving portion of the downstream data against the TV signals, and the circuit configuration thereof is much simplified.

SUMMARY OF THE INVENTION

In accordance with the invention, both the video frequencies and an accompanying digital data signal at a selected frequency received in a CATV system are applied to a first frequency conversion device (mixer) for shifting the video band to a higher frequency band in which a selected channel is at a predetermined frequency. The data signal is concurrently converted to a higher frequency band but this higher frequency signal is not employed; instead, the somewhat attenuated fundamental of the data signal frequency is extracted by filtering after the mixer. The data signal at the fundamental frequency is then amplified, demodulated, and employed in data processing circuits at the terminals of the system. Thus the data signal is reliably processed without need for a bandpass filter having a sharp cutoff characteristic, or adversely affecting the video signal.

BRIEF DESCRIPTION OF THE DRAWING

A better understanding of the invention may be had by reference to the following description, taken in conjunction with the accompanying drawing, in which the single FIGURE is a block diagram showing an embodiment of a terminal device for CATV according to the present invention.

DETAILED DESCRIPTION OF THE INVENTION

In the drawing, reference numeral 1 designates an input terminal to be connected with a cable extended between the central or head end and a terminal device. The cable is coupled to an input filter 2 through which a signal of a frequency in the range of from 50 to 300 mHz can pass. A first mixer 3 converts the frequency of signals passing through the input filter 2 into a higher band in the neighborhood of, for instance, 400 mHz. A channel selector 4 generates a DC voltage corresponding to each channel of the TV transmission system, and a first local oscillator 5 generates a frequency selected from a range of 450 to 700 mHz depending on the DC voltage delivered from the channel selector 4, so that the frequency of the input signal in one selected channel is converted into a predetermined higher frequency (in the neighborhood of 400 mHz). Numeral 6 designates an IF filter which passes TV signals in a range of 398.75 (video) to 403.25 (audio) mHz within the output of the first mixer 3. A second mixer 7 uses a 458.5 mHz signal generated in a second local oscillator 8, to convert the frequency of the output of the IF filter 6 down into an approximate value of 55–60 mHz. A bandpass filter 9 passes TV signals ranging from 55.25 mHz (the video frequency $fv$) to 59.75 mHz (the audio frequency $fa$), these being the frequencies for Channel 2 (used in this example) to a descrambler 10 which restores the normal form of an image signal which has been scrambled at the head end. The normalized signal is applied to an output filter 11 that passes TV signals in the band from 55.25 to 59.75 mHz to an output terminal 12 of the terminal device which is to be connected with an input terminal of an ordinary TV receiver.

A bandpass filter 13 passes an FSK (Frequency Shift Keyed) modulated downstream data signal of, for instance, 115.25 mHz within the output signals of the first mixer 3. It should be noted that the output signals from the filter 2 are converted by the first mixer 3 into frequencies in the neighborhood of 400 mHz, and the downstream data signal of 115.25 mHz sent from the head end is also subjected to the frequency conversion of the first mixer 3. However, although its level is lower than that of the center frequency of the output signals of the first mixer 3 by, for instance, approximately 5 dB, a residual fundamental frequency component of the downstream data signal of, for instance, 115.25 mHz which is far lower than the center frequency of the first mixer output, is also contained in the output of the first mixer 3. The bandpass filter 13 is provided to pick up this fundamental wave (of 115.25 mHz) of the downstream data signal instead of the high-frequency converted downstream data signal. After filtering, the signal is passed through an amplifier circuit 14, a demodulating circuit 15 for the FSK modulated downstream data signal, and to an amplifier circuit 16. A clock regenerating circuit 17 regenerates the clock signal from the demodulated downstream signal, and is coupled to a data reproducing circuit 18 which reproduces the downstream data employing the clock signal obtained by the clock regenerating circuit 17. A data processing device 19 then processes the data obtained by the data reproducing circuit 18.

A channel is selected by the channel selector 4 from the multichannel TV signal in a range of from 50 to 300 mHz in accordance with the viewer's desire. The thus selected TV signal is then converted by the first mixer 3 into a frequency approximating 400 mHz, again converted by the second mixer 7 into a frequency range which is receivable on a suitable vacant channel (a channel over which no TV over the air broadcast exists) of an ordinary TV receiver, and then sent through the output terminal 12 to the TV receiver. The data signal is also converted by the first mixer 3 into the higher frequency. However, the data signal is not extracted from the higher frequency band of the TV signal, but is extracted by means of the bandpass filter 13 as the fundamental frequency component (of 115.25 mHz), far separated from the IF frequency band of the TV signal, which has passed through a simulated buffer amplifier constituted by the first mixer 3. By way of example, a balanced FET mixer may be used, but in any event advantage is here taken of the fact that the mixing function cannot be perfectly performed and that a substantial residual of the fundamental is present in the output. If the downstream data signal were to be extracted from the frequency band of the input filter 2 which is a wide band filter, this would adversely affect the adjacent TV signal by introducing phase distortion and also the operation of the input filter 2. For eliminating this effect, a bandpass filter of sharp characteristic would be required. On the other hand, if a loose coupling of two filters were contemplated for eliminating the inteference of the two filters, the extracting loss of the data signal of 115.25 mHz would become great. However, the extraction of the fundamental wave component of the downstream data signal, as described hereinabove, after it has passed through the first mixer 3, causes no effect on the TV signal in the IF band, and makes it possible to obtain the downstream data signal very easily without requiring a filter of sharp frequency characteristic.

Since the downstream data signal in this embodiment is modulated in FSK mode, the signal is demodulated by the demodulation circuit 15 and amplified by the amplifier circuit 16. One part of the output signal from the amplifier circuit 16 is sent to the clock regenerating circuit 17, and the clock signal is regenerated in the circuit 17. Using the output of the amplifier circuit 16 and the clock signal, the data reproducing circuit 18 reproduces the downstream data. In the data processing device 19, the downstream data obtained from the data reproducing circuit 18 is processed by the use of the clock signal obtained from the clock regenerating circuit 17 or a clock signal independently generated in the data processing device 19.

The terminal device of this invention carries out a predetermined operation based on the instruction of the downstream data signal. For instance, in a terminal device for a subscriber authorized to receive a scrambled image signal, an instruction for operating the descrambler 10 in order to descramble the image signal is carried within the downstream data signal, and the data processing device 19 operates the descrambler 10 for restoring the disturbed image signal to its original state.

According to the present invention, the downstream data signal is extracted not from the higher frequency band obtained after converting the frequencies of a TV signal and the downstream data signal by the first mixer, but as the fundamental wave component of the same data signal passed through the first mixer without conversion. Although the strength level of this component is somewhat lower than the IF frequency band component of the TV signal, the extraction can be effectuated without requiring any bandpass filter of sharp frequency characteristic. Furthermore, since the data signal is not extracted from the high frequency band of the TV signal, there is no possibility of adversely affecting the TV signal, and these and other advantageous effects can be obtained by a terminal device for CATV of this invention which can be constructed at a low cost.

What is claimed is:

1. A terminal device for CATV characterized in that the device comprises a first mixer for converting the frequency of any one of multichannel TV signals received through a cable into a predetermined value, a second mixer for converting the frequency of the output of the first mixer into a value receivable on a specific channel of an ordinary TV receiver, a bandpass filter for extracting a fundamental wave component, not frequency-converted, of a downstream data signal from the output of the first mixer, a circuit for demodulating the downsteam data signal passed through the bandpass filter, a clock regenerating circuit for regenerating a clock signal from the output of the demodulating circuit, a data reproducing circuit which reproduces the downstream data from the output of the demodulating circuit by the use of the clock signal obtained from the clock regenerating circuit, and a data processing device which processes the downstream data obtained from the data reproducing circuit, such that the first mixer is utilized as an isolating circuit for the downstream data signal.

2. In a CATV system transmitting within a selected bandwidth a plurality of video channels of different frequencies and also a data signal at a selected adjacent frequency downstream to individual subscriber's terminals, the combination comprising:

frequency converter means controllable by a subscriber for converting the selected bandwidth to a selected frequency range in which a chosen video channel is at a predetermined frequency;

video signal processing means responsive to the predetermined frequency for providing the desired video program;

data signal extracting means coupled to derive the fundamental, unconverted, data signal frequency from the output of the frequency converter means; and means responsive to the unconverted data signal frequency for deriving digital data therefrom.

3. The invention as set forth in claim 2 above, wherein said system transmits the data signal at a carrier frequency closely adjacent at least one video channel, wherein the first frequency converter means comprises a mixer providing the fundamental frequency of the data signal with approximately 5 dB attenuation and wherein said data signal extracting means comprises bandpass filter means, amplifier means and demodulating means.

4. The invention as set forth in claim 3 above, wherein the mixer converts the incoming frequencies to a higher frequency band, and wherein the system further includes an IF filter and a second frequency converter means converting the higher frequencies from the IF filter to a lower frequency band.